United States Patent Office  3,176,022
Patented Mar. 30, 1965

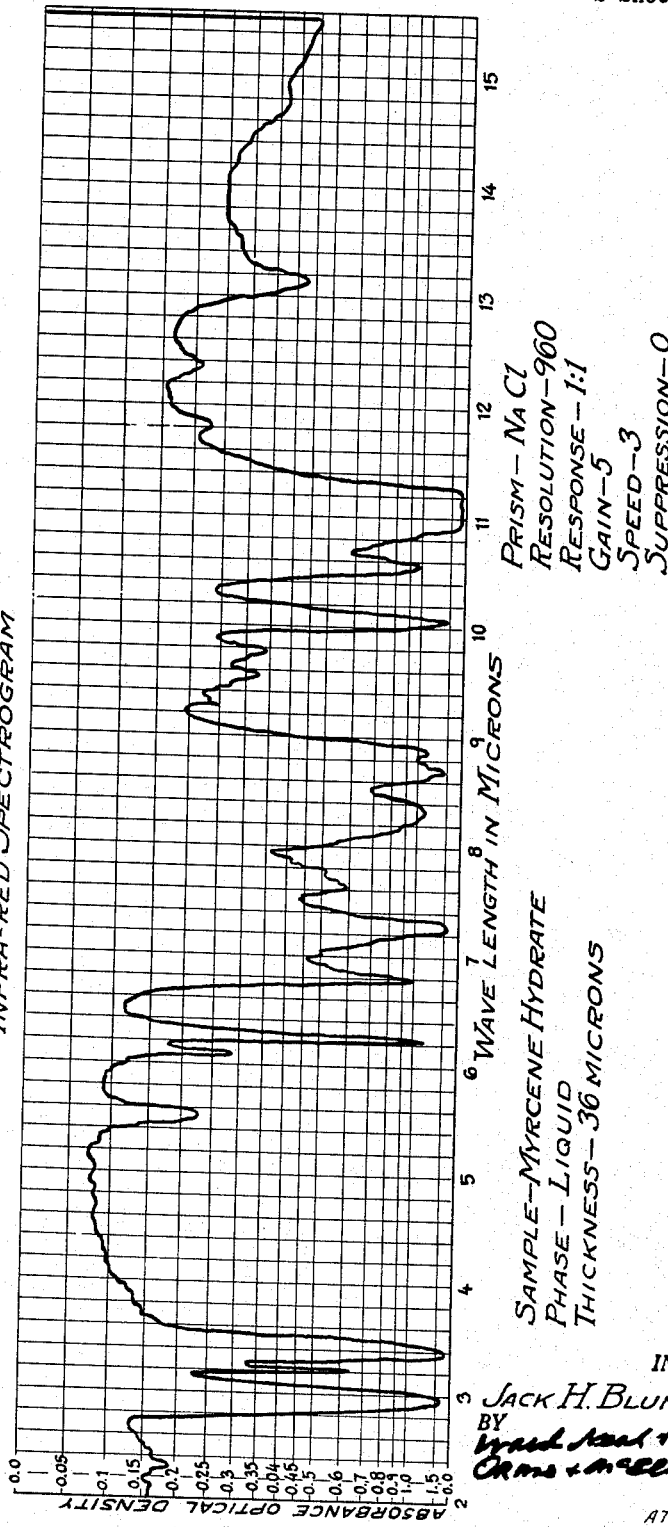

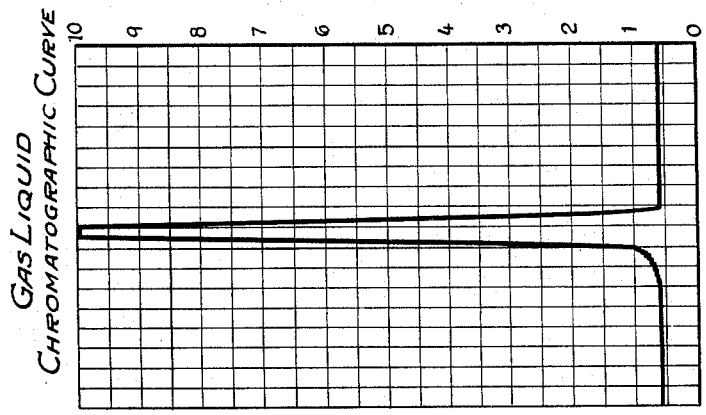
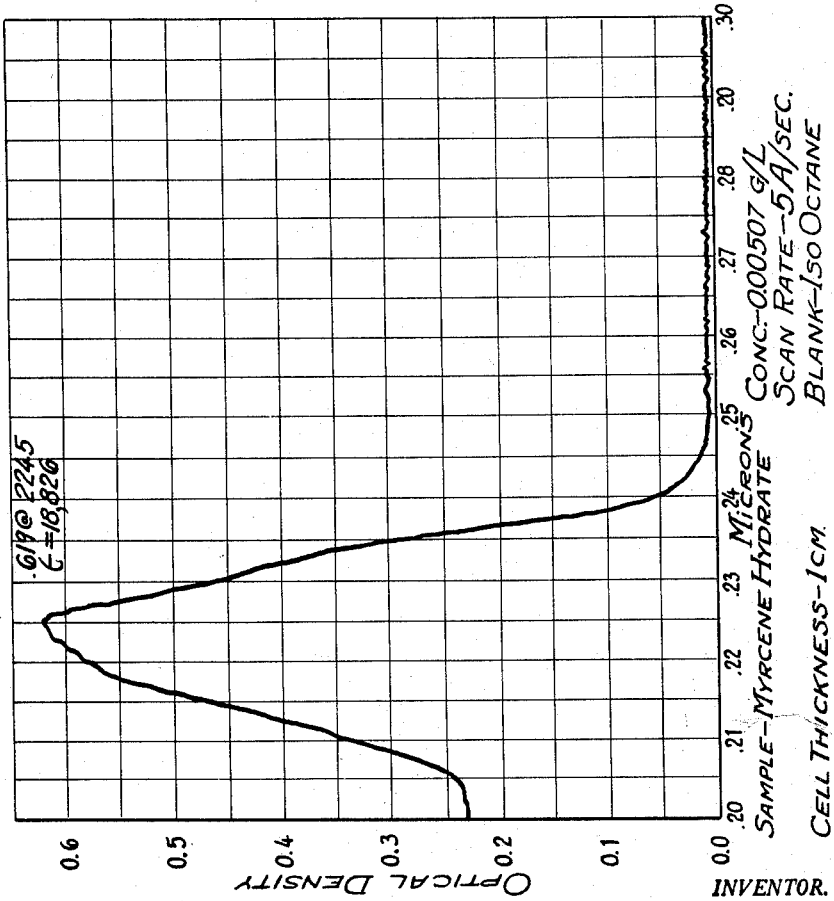

3,176,022
MYRCENE SULFONE HYDRATE AND PROCESS FOR MAKING SAME
Jack H. Blumenthal, Oakhurst, N.J., assignor to International Flavors & Fragrances Inc., New York, N.Y., a corporation of New York
Filed May 29, 1964, Ser. No. 372,142
5 Claims. (Cl. 260—332.1)

This invention relates to myrcene sulfone and hydrate thereof, and the process of making same.

The trivial name "myrcenol" has been used by various prior workers to designate substances having widely varying compositions. In no case was it used to designate the pure material 2-methyl-6-methylene-7-octene-2-ol. One of the materials so designated appears in the patent to Booth, No. 2,871,271, wherein the material is actually assigned the structure 2-methyl-6-methylene-7-octene-2-ol. This composition is actually a mixture containing other materials to the extent of about 50%. Compositions described by other prior workers in the art under the name "myrcenol" are even more remote from 2-methyl-6-methylene-7-octene-2-ol in their composition. We therefore avoid the use of the abused term "myrcenol" and are designating 2-methyl-6-methylene-7-octene-2-ol by the short term "myrcene hydrate."

The principal object of the present invention is to obtain myrcene sulfone and hydrate thereof, and to devise a process for producing same.

Said myrcene sulfone and hydrate thereof are intermediates in the preparation of the above mentioned myrcene hydrate.

The invention accordingly comprises the novel products and intermediates thereof, as well as the process and steps of process according to which such products are manufactured, the specific embodiments of which are described hereinafter by way of example and in accordance with which I now prefer to practice the invention.

In practicing the invention I react myrcene with sulfur dioxide to produce myrcene sulfone, and then hydrate the myrcene sulfone with an aqueous mineral acid to produce myrcene sulfone hydrate. This myrcene sulfone hydrate is then decomposed by heating it to liberate sulfur dioxide, and thereby to produce the compound 2-methyl-6-methylene-7-octene-2-ol in pure form. The sulfur dioxide is the usual product which is substantially anhydrous. The myrcene is a commercial product ordinarily found on the market containing approximately 75% myrcene together with other terpenes, notably dipentene, as impurities.

Commercial myrcene preferably in the presence of about 1% of an inhibitor of polymerization such as hydroquinone, ionol, phenyl-β-naphthylamine, etc., to prevent polymerization and polysulfone formation, is stirred with an excess of sulfur dioxide in a closed vessel at 60 to 100° C. at autogenous pressure over a period of 2-6 hours. After cooling and removal of the excess $SO_2$, any unreacted material is removed by stripping, viz., distillation under vacuum. The reaction may also be carried out without an inhibitor.

The reaction may also be carried out without an inhibitor.

The reaction occurring as above indicated is as follows:

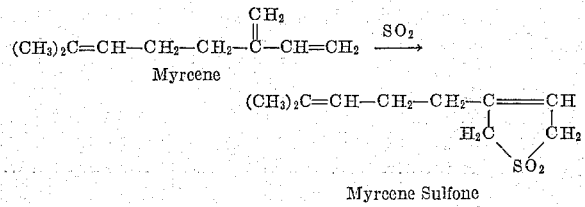

Myrcene Sulfone

The crude sulfone is then hydrated at the isopropylidene double bond. The reaction mixture is then separated into an oil layer and water layer. The oil layer is separated with the aid of a solvent such as benzene, and the solvent removed under vacuum.

The reaction occurring here is:

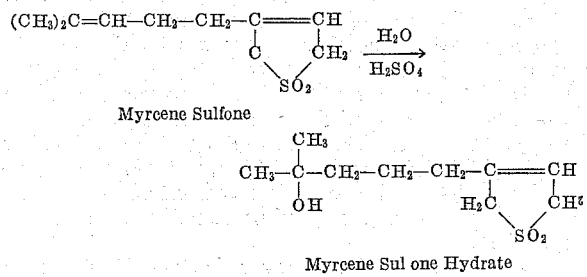

Myrcene Sulfone Hydrate

The crude sulfone hydrate is then decomposed by heating under vacuum at 120 to 170° C. to obtain the desired hydrate, 2-methyl-6-methylene-7-octene-2-ol. It is evident that this process can be conducted in a continuous manner as well as in discrete steps as herein described.

Although not absolutely required, when decomposing large quantities we may conduct the decomposition of the sulfone hydrate in the presence of 1 to 2% of a high boiling organic base such as triethanolamine or Primene JM (Rohm & Haas), which is a mixture of tertiary alkylamines. Weak inorganic bases such as $CaCO_3$ may be also used.

The reaction occurring here is:

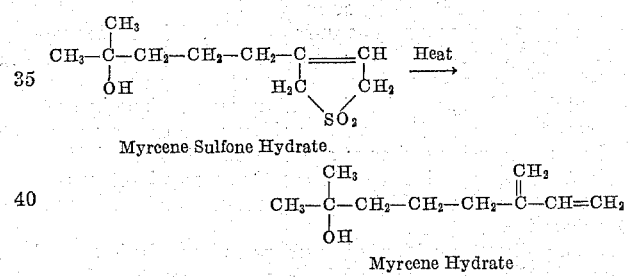

Myrcene Hydrate

The product obtained is a water-white liquid having the characteristics mentioned below, which is 2-methyl-6-methylene-7-octene-2-ol. The intermediate products are: (a) the myrcene sulfone, which in its crude state is a brown oily liquid whose characteristics will vary over a relatively wide range depending on the amount of polymer present and on the efficiency of the stripping operation. Its characteristics in both the crude and refined states are given below. The crude myrcene sulfone may be used in the step for producing the sulfone hydrate without purification; and (b) the myrcene sulfone hydrate, which in its crude state is an orange colored viscous oil whose density and refractive index will also vary over a relatively wide range depending on the presence of polymer and the efficiency of the stripping operation. Its characteristics in the crude and refined states are given below. It is not necessary that the pure sulfone hydrate be employed for the step of producing the pure 2-methyl-6-methylene-7-octene-2-ol.

The following are examples of the manner in which I now prefer to practice my invention. It is understood that these examples are purely illustrative, and that the invention is not to be considered as restricted thereto except as indicated in the claims.

The myrcene used (approximately 75% myrcene) in the examples below is the aforesaid usual product of commerce obtained from the pyrolysis of β-pinene, and contains other terpenes, notably dipentene, as impurities.

EXAMPLE 1

(A) *Preparation of myrcene sulfone.*—1200 grams of commercial myrcene (75% myrcene) and 1200 grams of anhydrous sulfur dioxide and 10 grams of Ionol (2,6-ditertiary butyl-p-cresol) were placed in a 4 liter stainless steel autoclave and stirred at 70° C. for 2 hours. The reaction mass was cooled and the excess sulfur dioxide vented. The residue was stripped of any unreacted materials by distillation at 5 mm. to a liquid (pot) temperature of 82° C. The weight of the residue was 1322 grams, and by analysis consisted of 95% myrcene sulfone. Yield: 94.5% of theory (based on myrcene content of commercial myrcene). The crude sulfone was fractionated in a "wiping" still (Rodney Hunt Machine Co.) with final pressure and temperature at 20–30 microns vacuum and at 80–90° C. Characteristics of the distilled myrcene sulfone, at least 99% pure, are as follows: very pale yellow heavy oil $N_D^{20}$ 1.5069, $D_{20}^{20}$ 1.0985, water-insoluble, generally soluble in usual organic solvents; limited solubility in hydrocarbon solvents, sulfur 15.9% obtained, theoretical 16.0%.

(B) *Hydration of myrcene sulfone.*—400 grams of crude myrcene sulfone as prepared in Example 1(A) was stirred vigorously with 1200 grams of 50% (by weight) sulfuric acid for a period of one-half hour at 20° C. The reaction mass was added to 2400 cc. of cold water and some polymeric material was separated and discarded. The acid was carefully neutralized to pH 8 with sodium hydroxide while keeping the temperature below 50° C., with cooling and good stirring. The oil layer which formed was separated with the aid of some benzene and the water layer was extracted with additional benzene. The benzene solutions were combined and the benzene plus traces of water were removed under a vacuum of 5 mm. to a liquid temperature of 70° C. The weight of the residue (crude sulfone hydrate) was 384 grams, and by analysis consisted of 93% of the sulfone hydrate. Yield 86% of theory (based on myrcene sulfone used). The crude myrcene sulfone hydrate was distilled in said "wiping" still with final pressure and temperature at 20 microns vacuum and 90–95° C., and the distilled myrcene sulfone hydrate was at least 98.5% pure. Its characteristics are as follows: pale yellow viscous oil $N_D^{20}$ 1.5020, $D_{20}^{20}$ 1.1500; partially soluble in water at 25° C.; soluble in ether and in benzene; insoluble in hexane; sulfur 14.5% obtained, theoretical 14.68%.

(C) *Decomposition of myrcene sulfone hydrate and production of 2-methyl-6-methylene-7-octene-2-ol.*—96 grams of the sulfone hydrate prepared as in Example 1(B) was placed in a 200 ml. flask fitted with a short column and a water condenser. The liquid temperature was brought to 140–160° C., and the myrcene hydrate distilled over at 85–100° C. at a vacuum of 2–4 mm. The distillate weighed 57 grams, and after being freed of traces of sulfur dioxide by purging with nitrogen had a refractive index of $N_D^{20}$ 1.4729. The gas-liquid partition chromatogram (GLPC) showed a purity of over 98%. Yield 88.5% of theory, based on myrcene sulfone hydrate used. The 2% impurity was mainly myrcene with no other alcohol present. Redistillation gave a pure water-white liquid product (as shown by the GLPC) B.P. 78° C. (5 mm.) $N_D^{20}$ 1.4731, $D_{20}^{20}$ 0.8711, $MR_{obs}$ 49.60, $MR_{calc}$. 48.98. The product has a fresh, slightly limey, flowery odor. The product is 2-methyl-6-methylene-7-octene-2-ol.

Since 2-methyl-6-methylene-7-octene-2-ol polymerizes readily, it should be protected at all times with an inhibitor such as hydroquinone, Ionol, phenyl-β-naphthylamine, etc.

When working on a larger scale a continuous thin-film evaporator is preferred for the decomposition to minimize the formation of by-odors. A dilute caustic wash, followed by a water wash, is also effective for the same purpose.

EXAMPLE 2

*Preparation of acetate of myrcene hydrate.*—750 grams of acetic anhydride and 5.0 grams of 85% phosphoric acid are placed in a suitable flask and heated to 40° C. To this solution at 40° C. there is added over a period of 1–2 hours, 500 grams of 2-methyl-6-methylene-7-octene-2-ol (containing 1% Ionol). After stirring for one additional hour after the completion of addition, sodium bicarbonate is added to neutralize the phosphoric acid, and stirring is continued for one hour. The mass is then treated with two volumes of water with stirring for 30 minutes, and the oil which separates is washed neutral with sodium bicarbonate solution. Fractionation of this washed oil at 0.5 mm. yields 450 grams of the acetate of 2-methyl-6-methylene-7-octene-2-ol, a water-white liquid boiling at 53° C., and having a refractive index of $N_D^{20}$ 1.4590, and a density of $D_{20}^{20}$ 0.9100. The ester tests 99.4% by saponification. It should be protected with one of the usual polymerization inhibitors, as mentioned in Example 1(C). The odor is an individual fresh, woody cologne odor, with a mossy undertone.

Further examples for the preparation of myrcene sulfone and myrcene sulfone hydrate are given below.

EXAMPLE 3

(A) *Preparation of myrcene sulfone.*—To 5100 grams of 76% myrcene and 20 grams of Ionol (2,6-ditertiary butyl-p-cresol) in a 4-liter stainless steel autoclave was added, with stirring, 2000 grams of sulfur dioxide at 70–80° C. over a three hour period. The reaction mixture was stirred at 80° C. for another three hours, then cooled and the autoclave vented. The product was distilled (topped) at 5 mm. to a liquid temperature of 70° C. to remove unreacted terpenes to give a crude myrcene sulfone. The residue weighed 6250 grams and tested 88% as myrcene sulfone by infrared (IR) analysis.

(B) *Hydration of myrcene sulfone.*—To 1800 grams of 50% sulfuric acid was added rapidly at 18° C. 4.17 moles of topped myrcene sulfone (88% by IR analysis) prepared as in Example 3(A). The reaction mixture was stirred at 20–22° C. for four hours and then was added to a mixture of 2500 grams of 15% $Na_2SO_4$ solution and 400 grams of benzene. After stirring for 30 minutes, the layers were separated and the aqueous layer extracted three times with benzene. The combined organic layer was washed neutral with sodium bicarbonate solution (saturated with myrcene sulfone hydrate) and the solvent stripped off at 5 mm. to a liquid temperature of 70° C. The residue weighed 1070 grams and contained 73.8% myrcene sulfone hydrate (87% yield of theory).

EXAMPLE 4

(A) *Preparation of myrcene sulfone.*—To 1200 grams of freshly prepared β-pinene pyrolysate, containing 76% myrcene, without inhibitor, in a 4 liter, stainless steel autoclave, was added, with stirring, 450 grams of sulfur dioxide over a three hour period at 70–80° C. The reaction mixture was stirred for another three hours at 80° C. and then cooled and the excess $SO_2$ vented. The reaction mixture was topped at 5 mm. to a liquid temperature of 70° C. to remove unreacted terpenes to give a crude myrcene sulfone. The residue tested 44.2% as myrcene sulfone by IR analysis.

(B) *Hydration of myrcene sulfone.*—To 1800 grams of 50% sulfuric acid, cooled to 18° C., was added, rapidly, with stirring, 950 grams of the crude topped myrcene sulfone prepared as in Example 4(A). The mixture was stirrred at 20–22° C. for four hours, whereupon an oil layer separated and was removed with the aid of 50 grams of benzene and discarded. The aqueous liquid layer was diluted with 2000 grams of 15% $Na_2SO_4$ solution, stirred for 30 minutes and separated into an aqueous layer and an oil layer. The aqueous layer was extracted with benzene three times. The oil layer, after such dilution, and the benezene extracts were combined and washed neutral with sodium bicarbonate solution, saturated with myrcene sulfone hydrate, and the solvent removed under a vacuum of 5 mm. to a liquid temperature of 70° C. The residue weighed 386 grams and contained 92% myrcene sulfone hydrate (78% yield of theory based on myrcene sulfone).

EXAMPLE 5

A mixture of 500 grams of 88% myrcene sulfone obtained as by Example 3(A), and 1000 grams of 50% phosphoric acid was stirred at 50–55° C. for four hours and then added to 1500 grams of 15% $Na_2SO_4$ solution extracted with 200 grams of benzene four times. The combined organic layer was washed neutral with sodium bicarbonate solution and the solvent stripped off at 5 mm. to a liquid temperature of 70° C. The residue weighed 503 grams and contained 72.2% myrcene sulfone hydrate (76% yield of theory).

EXAMPLE 6

A mixture of 800 grams of 86% myrcene sulfone obtained as by Example 3(A), and 2400 grams of 11% hydrochloric acid was stirred at 50–55° C. for twelve hours. The reaction mixture was diluted with 800 grams of 15% sodium sulfate solution and extracted with benzene three times. The combined organic layer was washed neutral with sodium bicarbonate solution (previously saturated with myrcene sulfone hydrate) and the solvent removed at 5 mm. to a liquid temperature of 70° C. The residue weighed 691 grams and contained 61.7% myrcene sulfone hydrate (57% yield of theory).

EXAMPLE 7

A mixture of 600 mm. of 24% aqueous methane sulfonic acid and 200 grams of myrcene sulfone obtained as by Example 3(A), was stirred at 60° C. for four hours and the reaction mixture worked as in Example 6. The residue weighed 207 grams and contained 39.4% myrcene sulfone hydrate.

EXAMPLE 8

A mixture of 1200 grams of 25% sulfuric acid and 400 grams of 88% myrcene sulfone obtained as by Example 3(A), was stirred at 50–55° C. for three hours, and worked up as above. The residue weighed 425 grams and contained 62.5% myrcene sulfone hydrate (69% yield of theory).

EXAMPLE 9

A mixture of 700 grams of 15% sulfuric acid and 250 grams of 80% myrcene sulfone obtained as by Example 3(A), was stirred at 70° C. for three hours, 60° C. for five hours, 50° C. for eight hours, and 40° C. for four hours. The oil layer was separated with the aid of some benzene and the aqueous layer extracted twice with benzene. The combined organic layer was washed neutral with water, sodium bicarbonate and water, and the solvent was stripped off under vacuum. The residue weighed 214 grams and contained 52.2% myrcene sulfone hydrate (51% yield of theory).

Each of the products myrcene sulfone hydrate of Examples 3 to 9, inclusive, may be treated as hereinabove described, particularly according to Example 1(C), above, to produce myrcene hydrate. The myrcene hydrate so prepared may be converted to the acetate by the process of Example 2, above.

In addition to the characteristics of the compound 2-methyl-6-methylene-7-octene-2-ol given above, further and complete proof of the composition is discussed below, and is shown in the accompanying drawings, in which:

FIG. 1 represents an infrared spectrogram of 2-methyl-6-methylene-7-octene-2-ol;

FIG. 2 is a gas-liquid partition chromatographic curve thereof, and

FIG. 3 is an ultraviolet spectrogram thereof.

Referring to FIG. 1, the infrared spectrum of 2-methyl-6-methylene-7-octene-2-ol has a very strong absorption centered around 900 cm.$^{-1}$ and a peak at 990$^{-1}$, indicating the presence of a vinyl and vinylidene group, and two peaks at 1600 cm.$^{-1}$ and 1635 cm.$^{-1}$, indicating conjugated double bonds. Similar peaks, with about the same intensities, are also found in myrcene. The myrcene hydrate also has a large hydroxyl absorption at 3330 cm.$^{-1}$ and absorption peaks in the tertiary hyroxyl region at 1125, 1150 and 1200 cm.$^{-1}$, as well as another peak at 943 cm.$^{-1}$, which are not present in myrcene.

Referring to FIG. 2, the gas-liquid partition chromatogram of the new myrcene hydrate showed only one peak, this indicating the absence of impurities. The new hydrate absorbed two moles of hydrogen, indicating the presence of two double bonds, to yield a saturated alcohol which had the following physical constants: B.P. 85° C. (9 mm.), $N_D^{20}$ 1.4334, $D_{20}^{20}$ 0.8662, phenyl urethane M.P. 85.8–86.2° C. Almost identical physical constants were reported by Houlihan, J. Org. Chem., 23, 689 (1958) for 2,6-dimethyl-2-octanol. Thus there is no question that the carbon skeleton and position of the hydroxyl group of the new hydrate is established.

Referring to FIG. 3, the ultraviolet absorption maximum is shown at 2240A in iso-octane, with an epsilon (extinction coefficient) of 18,826. Contrasting this coefficient with that reported by Booth in Patent No. 2,871,271, we find that Booth reports an epsilon of 9600 for his material. Comparison of these ultraviolet extinction values shows that Booth's value is a little more than half that of the pure 2-methyl-6-methylene-7-octene-2-ol, and accordingly the Booth figures shows a mixture of materials, no one of which was present in the proportion of more than about 51%.

So far as I am aware, I am accordingly the first to produce pure 2-methyl-6-methylene-7-octene-2-ol, and I am the first to determine that this pure product is a perfume material having the odor given. I have thus established that the odor is due to 2-methyl-6-methylene-7-octene-2-ol, and not to impurities occurring therewith, and which are present in compounds such as those mentioned by Booth.

I am also the first to produce the myrcene sulfone hydrate, so far as I am aware.

This application is a continuation-in-part of my copending application Serial No. 196,823, filed May 22, 1962, which was a division of application Serial No. 814,912, filed May 21, 1959, now Patent No. 3,075,003.

I claim:

1. Myrcene sulfone hydrate, having the formula:

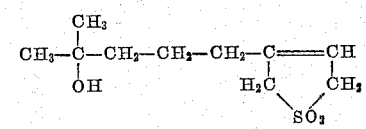

2. A process which comprises heating myrcene with sulfuur dioxide to produce myrcene sulfone, and reacting myrcene sulfone with an aqueous mineral acid to produce myrcene sulfone hydrate.

3. A process which comprises reacting myrcene sulfone with an aqueous mineral acid and producing myrcene sulfone hydrate.

4. A process which comprises reacting myrcene sufone with aqueous sulfuric acid and producing myrcene sulfone hydrate.

5. A process which comprises reacting myrcene with anhydrous sulfur dioxide to produce myrcene sulfone, in the presence of an inhibitor of polymerization of myrcene and myrcene sulfone, and reacting the myrcene sulfone with aqueous sulfuric acid to produce myrcene sulfone hydrate.

No references cited.